(12) United States Patent
Dice et al.

(10) Patent No.: US 12,056,540 B2
(45) Date of Patent: *Aug. 6, 2024

(54) GENERIC CONCURRENCY RESTRICTION

(71) Applicant: Oracle International Corporation, Redwood City, CA (US)

(72) Inventors: David Dice, Foxboro, MA (US); Alex Kogan, Needham, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,588

(22) Filed: Jun. 26, 2023

(65) Prior Publication Data

US 2023/0333916 A1 Oct. 19, 2023

Related U.S. Application Data

(63) Continuation of application No. 17/547,505, filed on Dec. 10, 2021, now Pat. No. 11,726,838, which is a continuation of application No. 16/791,178, filed on Feb. 14, 2020, now Pat. No. 11,221,891, which is a continuation of application No. 15/298,090, filed on Oct. 19, 2016, now Pat. No. 10,565,024.

(51) Int. Cl.
*G06F 9/52* (2006.01)
*G06F 9/50* (2006.01)

(52) U.S. Cl.
CPC .............. *G06F 9/52* (2013.01); *G06F 9/5022* (2013.01); *G06F 9/524* (2013.01)

(58) Field of Classification Search
None
See application file for complete search history.

(56) References Cited

U.S. PATENT DOCUMENTS

| | | |
|---|---|---|
| 4,574,350 A | 3/1986 | Starr |
| 4,716,528 A | 12/1987 | Crus et al. |
| 5,414,839 A | 5/1995 | Joshi |
| 6,112,222 A | 8/2000 | Govindaraju et al. |
| 6,247,025 B1 | 6/2001 | Bacon |

(Continued)

OTHER PUBLICATIONS

John M. Mello-Crummey, et al., "Algorithms for Scalable Synchronization on Shared-Memory Multiprocessors", ACM Transactions on Computer Systems (TOCS) 9.1, 1991, pp. 21-65.

(Continued)

*Primary Examiner* — Hiren P Patel
(74) *Attorney, Agent, or Firm* — Robert C. Kowert; Kowert, Hood, Munyon, Rankin & Goetzel, P.C.

(57) ABSTRACT

Generic Concurrency Restriction (GCR) may divide a set of threads waiting to acquire a lock into two sets: an active set currently able to contend for the lock, and a passive set waiting for an opportunity to join the active set and contend for the lock. The number of threads in the active set may be limited to a predefined maximum or even a single thread. Generic Concurrency Restriction may be implemented as a wrapper around an existing lock implementation. Generic Concurrency Restriction may, in some embodiments, be unfair (e.g., to some threads) over the short term, but may improve the overall throughput of the underlying multithreaded application via passivation of a portion of the waiting threads.

20 Claims, 12 Drawing Sheets

(56) References Cited

U.S. PATENT DOCUMENTS

| | | |
|---|---|---|
| 6,735,760 B1 | 5/2004 | Dice |
| 6,792,601 B1 | 9/2004 | Dimpsey et al. |
| 7,318,128 B1 | 1/2008 | Dice |
| 7,500,242 B2 | 3/2009 | Shah et al. |
| 7,594,234 B1 | 9/2009 | Dice |
| 7,681,197 B1 * | 3/2010 | Kinnear ............... G06F 9/526 710/200 |
| 7,685,409 B2 | 3/2010 | Du et al. |
| 7,844,973 B1 | 11/2010 | Dice |
| 8,020,166 B2 | 9/2011 | Ruemmler |
| 8,046,758 B2 | 11/2011 | Dice |
| 8,051,418 B1 | 11/2011 | Dice |
| 8,245,207 B1 | 8/2012 | English et al. |
| 8,345,053 B2 | 1/2013 | Jiao et al. |
| 8,407,708 B2 | 3/2013 | Dice |
| 8,683,470 B2 | 3/2014 | Omara et al. |
| 8,694,706 B2 | 4/2014 | Dice et al. |
| 8,775,837 B2 | 7/2014 | Dice et al. |
| 8,954,974 B1 | 2/2015 | Accapadi et al. |
| 8,966,491 B2 | 2/2015 | Calciu et al. |
| 8,997,101 B2 | 3/2015 | Omara et al. |
| 9,798,591 B2 | 10/2017 | Xu et al. |
| 9,830,200 B2 | 11/2017 | Duvuru et al. |
| 9,996,402 B2 | 6/2018 | Yadav |
| 10,055,129 B2 | 8/2018 | Kogan et al. |
| 10,102,037 B2 | 10/2018 | Accapadi et al. |
| 10,331,499 B2 | 6/2019 | Xu et al. |
| 10,417,056 B2 | 9/2019 | Dice |
| 10,565,024 B2 | 2/2020 | Dice et al. |
| 11,221,891 B2 | 1/2022 | Dice et al. |
| 11,314,562 B2 | 4/2022 | Dice et al. |
| 2003/0041173 A1 | 2/2003 | Hoyle |
| 2003/0236816 A1 | 12/2003 | Venkatasubramanian |
| 2005/0028157 A1 | 2/2005 | Betancourt et al. |
| 2005/0081204 A1 | 4/2005 | Schopp |
| 2006/0026566 A1 | 2/2006 | Cabillic et al. |
| 2006/0048149 A1 | 3/2006 | Clift |
| 2007/0093243 A1 | 4/2007 | Kapadekar et al. |
| 2007/0136725 A1 | 6/2007 | Accapadi et al. |
| 2007/0169002 A1 | 7/2007 | Kronlund et al. |
| 2008/0184238 A1 | 7/2008 | Ruemmler |
| 2010/0100889 A1 | 4/2010 | Labrie et al. |
| 2010/0122253 A1 * | 5/2010 | McCart ............... G06F 8/458 718/100 |
| 2010/0241774 A1 | 9/2010 | Olszewski et al. |
| 2011/0225592 A1 * | 9/2011 | Goldin ............... G06F 11/3612 718/104 |
| 2012/0246652 A1 | 9/2012 | King-Smith et al. |
| 2012/0291034 A1 | 11/2012 | Kamath et al. |
| 2012/0311606 A1 | 12/2012 | Marathe et al. |
| 2013/0290583 A1 | 10/2013 | Dice et al. |
| 2013/0290967 A1 | 10/2013 | Calciu et al. |
| 2014/0040519 A1 * | 2/2014 | Ur ............... G06F 9/526 710/200 |
| 2014/0373029 A1 | 12/2014 | Levine et al. |
| 2015/0026688 A1 | 1/2015 | Dice et al. |
| 2015/0286586 A1 | 10/2015 | Yadav |
| 2015/0301871 A1 | 10/2015 | Duvuru et al. |
| 2016/0092280 A1 | 3/2016 | Ai et al. |
| 2017/0220474 A1 | 8/2017 | Dice et al. |

OTHER PUBLICATIONS

F. Ryan Johnson, et al., "Decoupling Contention Management from Scheduling", ACM SIGARCH Computer Architecture News 38.1, 2010, pp. 117-128.

David Dice, "Malthusian Locks", Retrieved from URL: http://arxiv.org/abs/1511.06035v2, 2015, pp. 1-13.

Irina Calciu, et al., "Message Passing or Shared Memory: Evaluating the Delegation Abstraction for Multicores", International Conference on Principles of Distributed Systems, Springer International Publishing, 2013, pp. 83-97.

David Dice, et al., "Lock Cohorting: A General Technique for Designing NUMA Locks", ACM Transactions on Parallel Computing, vol. 1, No. 2, Article 13, Publication date: Jan. 2015, pp. 13:1-13:42.

Anderson, T.E., "The performance of spin lock alternatives for shared-money multiprocessors," IEEE Transactions on Parallel and Distributed Systems vol. 1, No. 1, Jan. 1990, pp. 6-16.

Jons-Tobias Wamhoff, et al., "The Turbo Diaries: Application-controlled Frequency Scaling Explained", USENIX ATC '14: 2014 USENIX Annual Technical Conference, Jun. 19-20, 2014, Retrieved from URL: https://www.usenix.org/system/files/conference/atc14/atc14-paper-wamhoff.pdf, pp. 192-204.

David Dice, et al., "Lock cohorting: A General Technique for Designing NUMA Locks", Proceedings of the 17th ACM SIGPLAN Symposium on Principles and Practice of Parallel Programming (PPoPP '12), 2012, ACM, pp. 247-256, New York, NY, USA.

Stijn Eyerman, et al., "Modeling Critical Sections in Amdahl's Law and its Implications for Multicore Design", In Proceedings of the 37th Annual International Symposium on Computer Architecture (ISCA '10), ACM, Jun. 19-23, 2010, pp. 362-370.

"Inverted schedctl usage in the JVM", Jun. 21, 2011, Retrieved from URL: https://blogs.oracle.com/dave/entry/inverted_schedctl_usage_in_the, Downloaded Sep. 24, 2015, pp. 1-6.

"Measuring long-term fairness for locks", Dec. 29, 2014, Retrieved from URL: https://blogs.oracle.com/dave/entry/measuring_long_term_fairness_for, Downloaded Sep. 24, 2015, pp. 1-4.

"Measuring short-term fairness for locks", Dec. 29, 2014, Retrieved from URL: https://blogs.oracle.com/dave/entry/measuring_short_term_fairness_for, Downloaded Sep. 24, 2015, pp. 1-4.

"Polite busy-waiting with WRPAUSE on SPARC", Oct. 24, 2012, Retrieved from URL: https://blogs.oracle.com/dave/entry/polite_busy_waiting_with_wrpause, Downloaded Sep. 24, 2015, pp. 1-6.

"TXPAUSE: polite waiting for hardware transactional memory", Oct. 25, 2012, Retrieved from URL: https://blogs.oracle.com/dave/entry/txpause_polite_waiting_for_hardware, Downloaded Sep. 24, 2015, pp. 1-5.

Davidlohr Bueso, "Scalability techniques for practical synchronization primitives", ACM, 2014. Retrieved from URL: http://delivery.acm.org/10.1145/2700000/2698990/p40-bueso.pdf, Downloaded Oct. 22, 2015, pp. 1-14.

U.S. Appl. No. 17/547,505, filed Dec. 10, 2021, Dice, et al.

* cited by examiner

GENERIC CONCURRENCY RESTRICTION

This application is a continuation of U.S. patent application Ser. No. 17/547,505, filed Dec. 10, 2021, which is a continuation of U.S. patent application Ser. No. 16/791,178, filed Feb. 14, 2020, now U.S. Pat. No. 11,221,891, which is a continuation of U.S. patent application Ser. No. 15/298,090, filed Oct. 19, 2016, now U.S. Pat. No. 10,565,024, which are hereby incorporated by reference herein in their entirety.

BACKGROUND

Field of the Disclosure

This disclosure relates generally to managing accesses to shared resources in a multithreaded environment, and more particularly to systems and methods for performing concurrency restriction and throttling over contended locks.

Description of the Related Art

Concurrent applications running on modern multicore architectures are quite often over-threaded, that is, they use more threads than needed to achieve optimal performance. In a multiprocessor environment with threads and preemptive scheduling, threads can participate in a mutual exclusion protocol through the use of lock or "mutex" constructs. A mutual exclusion lock can either be in a locked state or an unlocked state, and only one thread can hold or own the lock at any given time. The thread that owns the lock may be permitted to enter a critical section of code protected by the lock or otherwise access a shared resource protected by the lock. If a second thread attempts to obtain ownership of a lock while the lock is held by a first thread, the second thread may not be permitted to proceed into the critical section of code (or access the shared resource) until the first thread releases the lock and the second thread successfully claims ownership of the lock.

In modern multicore environments, it can often be the case that there are a large number of active threads, all contending for access to a shared resource. As multicore applications mature, situations in which there are too many threads for the available hardware resources to accommodate are becoming more common. As threads are added, even if the thread count remains below the number of logical CPUs, the application can reach a point at which aggregate throughput drops.

Very commonly, the degraded performance is the result of contended locks used by these applications to synchronize access to their shared data. The excess threads may lead to a scalability collapse phenomenon, where the throughput of threads circulating through a contended lock fades (or even drops abruptly) with the increase in the number of threads. This may happen due to competition for shared resources, such as computing cores or last-level cache (LLC). For instance, the increase in the number of distinct threads circulating through the lock may lead to increased cache pressure, resulting in cache misses and memory thrashing.

SUMMARY

Generic Concurrency Restriction (GCR), as described herein, may involve dividing a set of threads waiting to acquire a lock into two sets: an active set that is currently able to contend for the lock, and a passive set that awaits an opportunity to be able to contend for the lock (e.g., by joining the active set). In some embodiments, the number of threads in the active set may be limited to a predefined maximum and may, in some embodiments, be limited to a single thread. In some embodiments, each thread in the active set may circulate from executing its non-critical section to waiting, from waiting to lock ownership and execution of its critical section, and then back to executing its non-critical section.

Generic Concurrency Restriction may be implemented as a wrapper library (e.g., a set of methods or functions) around an existing, underlying lock implementation. Generic Concurrency Restriction may, in some embodiments, be unfair (e.g., to some threads) over the short term, but may improve the overall throughput of the underlying multithreaded application through passivation of a portion of the waiting threads, and various techniques for managing the intermixing of threads from the active set and passive set.

According to various embodiments, GCR may wrap virtually any lock implementation and may ensure that there are only a limited number (at most one, in some embodiments) of active threads waiting for the lock, while all other threads are passivated (e.g., they are passive, waiting to become active). Thus, GCR may achieve the goal of restricting concurrency under contention by controlling the set of threads allowed to invoke the API of the underlying lock. All this may be done without requiring any change to the lock implementation and/or to the application using these locks (except possibly recompiling the application to use a GCR library). In fact, GCR may be used by legacy applications through, e.g., LD_PRELOAD mechanism on Linux and/or Unix, even without recompiling those applications. While in some embodiments GCR may introduce small overhead when the underlying lock is not contended, GCR may, in some embodiments, bring substantial performance benefit in case of contention by avoiding the scalability collapse, as will be discussed in more detail subsequently

Figure 1:
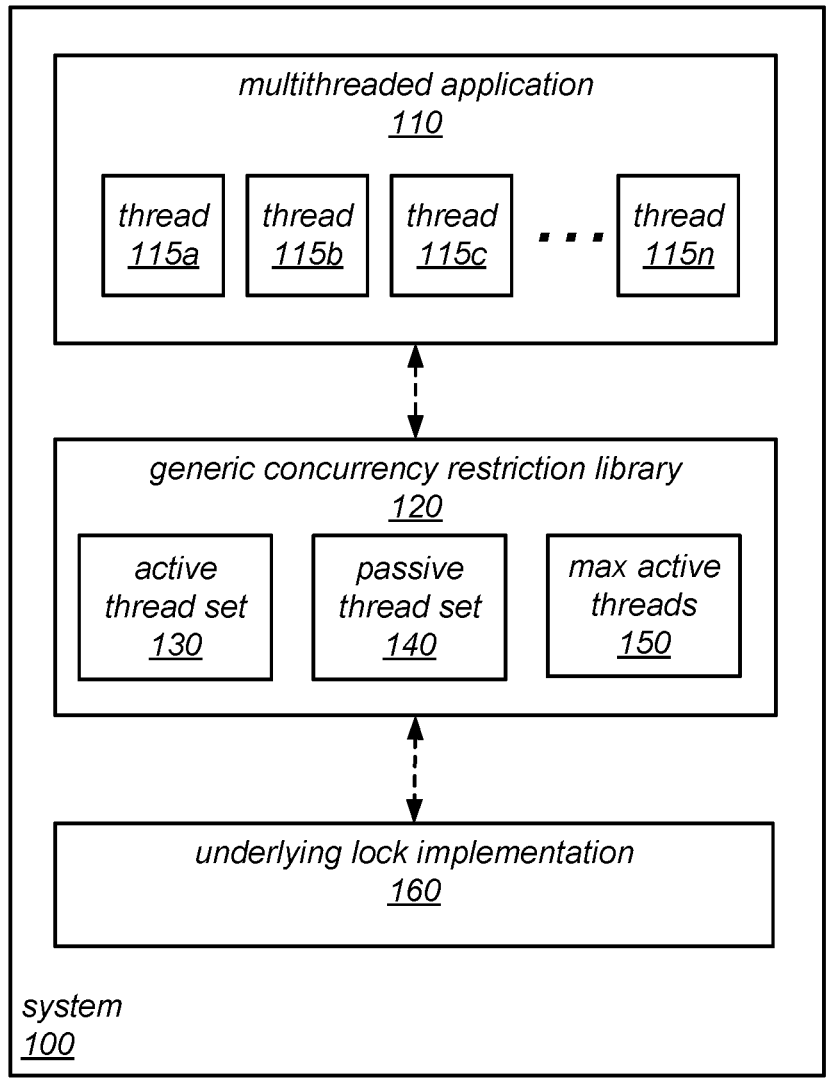
FIG. 1 is a block diagram illustrating one embodiment of a system implementing generic concurrency restriction, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, Generic Concurrency Restriction (GCR), as described herein, may involve dividing a set of threads waiting to acquire a lock into two sets: an active set that is currently able to contend for the lock, and a passive set that awaits an opportunity to be able to contend for the lock (e.g., by joining the active set). Often, multithreaded systems have contended locks. In some embodiments of the systems described herein, generic concurrency restriction (GCR) may be leveraged to restrict the number of threads in circulation. In some embodiments, the number of threads in the active set may be limited to a predefined maximum and may, in some embodiments, be limited to a single thread. In some embodiments, each thread in the active set may circulate from executing its non-critical section to waiting, from waiting to lock ownership and execution of its critical section, and then back to executing its non-critical section.

Concurrency restriction has been shown to be a very effective solution to the scalability collapse problem. This approach limits the number of distinct threads circulating over a lock in a given period of time. When the lock gets saturated (that is, held continuously) by those distinct threads, other (excess) threads may be culled and passively wait for their turn to compete for the lock and enter a critical section. To achieve long-term fairness, threads periodically move between the sets of actively circulating ones and those passively waiting. Concurrency restriction may avoid the scalability collapse and maintain a near-peak performance of contended locks even when the number of threads used by an application keeps growing, according to some embodiments.

For example, in some cases, an underlying lock that protects and/or controls access to a critical section of code (CS) or shared resource may have an excessive number of threads circulating through the lock. In this context, the term "excessive" may refer to a situation in which there are more than enough threads circulating over the lock to keep the lock fully saturated. In such situations, the excess or surplus threads typically do not contribute to performance, and often degrade overall collective throughput. In some embodiments, in order to reduce interference and improve performance, the systems described herein may, as part of GCR, apply passivation of some of the threads circulating over the lock.

In some embodiments, this may be accomplished by partitioning the circulating threads into an "active set" and a "passive set". The techniques described herein may act to minimize the size of the active set while still remaining work conserving. For example, these techniques may be used to ensure that the active set is sufficiently large to saturate the lock (so that the lock is not unnecessarily under-provisioned), but no larger. By restricting and constraining the size of the active set, the number of threads circulating over the lock in a given interval may be reduced.

In some embodiments that employ the concurrency-restricting mechanism described herein, threads in the active set may have to busy-wait only briefly before acquiring a contended lock. In some embodiments, at most one thread in the active set may be waiting to acquire a contended lock at any given moment. As described in more detail herein, excess threads may be quarantined in the passive set and may be blocked in the kernel. In various embodiments, threads in the active set may be thought of as being "enabled" and may operate normally, while threads in the passive set may be thought of as being "disabled" and may not circulate over the lock. As described in more detail below, threads may, from time to time, be explicitly shifted between the active circulation set and the passive set (e.g., to ensure long-term fairness). In various embodiments, the techniques described herein may be used to constrain concurrency in order to protect resources (e.g., residency in shared caches). These techniques may be unfair over the short-term, but may increase throughput.

Described herein are various techniques, methods, and/or mechanisms for implementing Generic Concurrency Restriction (GCR). According to various embodiments, GCR may wrap any lock implementation and ensure that there are only a limited number (at most one, in some embodiments) of active threads waiting for the lock, while all other threads are passivated (e.g., they are passive, waiting to become active). Thus, GCR may achieve the goal of restricting concurrency under contention by controlling the set of threads allowed to invoke the API of the underlying lock. All this may be done without requiring any change to the lock implementation and/or to the application using these locks (except to recompile to use a GCR library, perhaps). In fact, GCR may be used by legacy applications through, e.g., LD_PRELOAD mechanism on Linux and/or Unix, even without recompiling those applications. While in some embodiments GCR may introduce small overhead when the underlying lock is not contended, GCR may, in some embodiments, bring substantial performance benefit in case of contention by avoiding the scalability collapse, as will be discussed in more detail subsequently.

One embodiment of a system configured to implement Generic Concurrency Restriction is illustrated by the logical block diagram in FIG. 1. In this example, a system 100 may include an underlying lock implementation 160 for which generic concurrency restriction (CGR) library 120 provides a wrapper to manage access to the underlying lock by threads 115a-115n of multithreaded application 110. In some embodiments, GCR library 120 may be configured, and/or provided, such that legacy applications may utilize Generic Concurrency Restriction, as described herein, without requiring significant (or in some cases any) changes or modifications to the legacy application code. For example, in some embodiments, GCR library 120 may be configured to duplicate, and/or be otherwise compatible with, a lock implementation used by a legacy application and therefore the legacy application may be able to utilize GCR library 120 (e.g., after being re-compiled and/or re-linked) without change. GCR library 120 may represent virtually any collection of methods, such as a static library, a dynamic library, etc., according to different embodiments.

As illustrated in this example, a data structure representing the active thread set 130 may maintain data representing multiple threads that are currently contending for the lock (e.g., underlying lock implementation 160). As illustrated in this example, a data structure representing the passive thread set 140 may maintain data representing multiple threads that are not currently able to contend for ownership of the underlying lock. GCR library 102 may also include information indicating a threshold for the number of allowable threads in the active set, such as max active threads 150.

In various embodiments, as threads arrive at a shared lock, they may be partitioned into multiple sets of threads, including an active set (which may include threads that are circulating over the shared lock) and a passive set (which may include threads that are not immediately able to contend for the shared lock, but that are awaiting an opportunity to contend for the shared lock). A thread in the active circulation set may, after acquiring the underlying lock, access a critical section of code or shared resource that is protected by the underlying lock, after which it may release the lock. As described herein, the thread releasing the underlying lock may promote (or activate) one or more threads from the passive set to the active set, thereby allowing that thread to contend for the underlying lock.

Generic Concurrency Restriction Algorithm Overview

As described herein, active threads (e.g., threads allowed to invoke the API of the underlying lock) may be distinguished from passive threads not allowed to do so. Note, this distinction is for descriptive purposes only and is unrelated to any execution or running state of the corresponding threads. In other words, active threads may actually be parked (e.g., not executing), such as if the underlying lock decides to do so. Conversely, passive threads may be executing, such as running a spinning loop, waiting for their turn to join the set of active threads. Additionally, GCR may not, by itself, provide lock semantics (even though it may implement the lock API). Thus, any underlying lock may be referred to herein simply as "lock."

Figure 2:
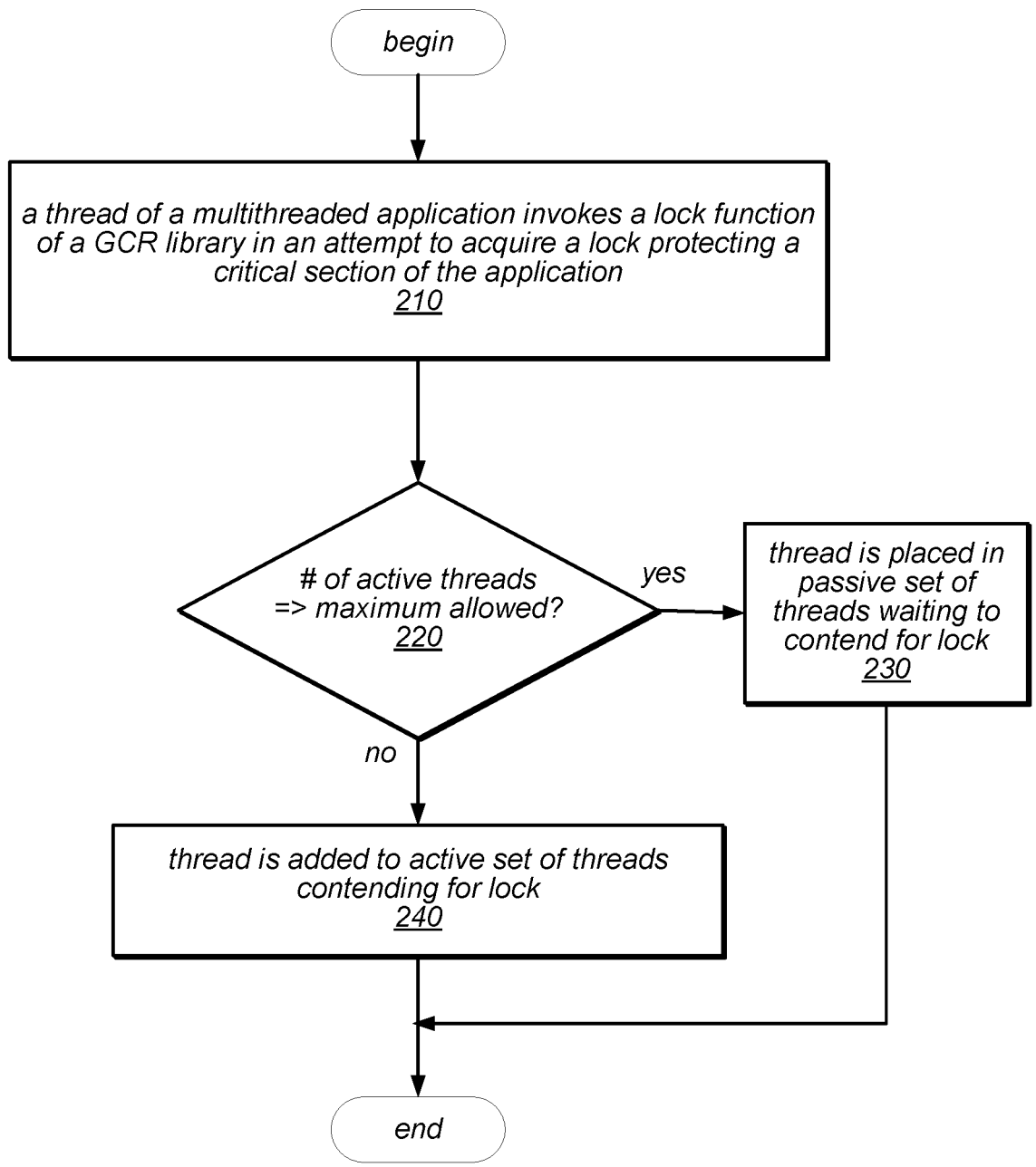
FIG. 2 is a flow diagram illustrating one embodiment of a method for generic concurrency restriction, as described herein.

One embodiment of a method for Generic Concurrency Restriction is illustrated by the flow diagram in FIG. 2. As illustrated in block 210, a thread of a multithreaded application may invoke a lock method of a Generic Concurrency Restriction library in an attempt to acquire a lock protecting a critical section of the application.

In some embodiments, GCR may track the number of active threads. When a thread invokes GCR's Lock method, GCR may check whether the number of active threads is larger than a preconfigured/predetermined threshold. In some embodiments, the threshold may allow at most one thread to be active and therefore at most one thread to contend for, or hold, the lock. In other embodiments, a preconfigured/predetermined threshold may allow more threads to contend for the lock. In other embodiments, the threshold may be configurable (e.g., by a user, programmer, or administrator). In yet other embodiments, the threshold may be automatically adjusted by the GCR library according to performance of the lock.

If the number of active threads is less than the maximum allowed (e.g., less than or equal to the preconfigured/predetermined threshold), as illustrated by the negative output of decision block 220, the thread may be added to the active set of threads contending for the lock, as in block 240, according to some embodiments. After being added to the active set, a thread may proceed by acquiring the lock, such as by calling the underlying lock's Lock method (which may, in some embodiments, be called by the GCR code being executed by the thread). This may constitute, and may be referred to herein as, a fast path of lock acquisition.

If, however, as illustrated by the positive output of decision block 220, the number of active threads is equal to or greater than the maximum allowed (e.g., larger than the preconfigured/predetermined threshold), the thread may be placed in a passive set (e.g., passive queue) of threads waiting to contend for the lock, as in block 230. For example, the GCR library (such as the Lock method invoked by the thread) may detect that the lock is saturated, and may place the (now passive) thread into a queue. This queue may be based on a linked list, where each node is associated with a different thread. For instance, in some embodiments, the passive set of threads may be maintained in an MCS-like queue. Every thread in the queue, except the first (e.g., the top or head node) may choose whether to keep spinning on a local variable in its respective node, yield the CPU and park, or any combination thereof, according to some embodiments.

The first thread (e.g., at the head) of the queue may monitor the number of active threads. In some embodiments, once the first thread in the queue detects that there are fewer active threads that the allowed maximum (e.g., no active threads in some embodiments), it may leave the queue, signal the next thread (if one exists) that the head of the queue has changed (possibly unparking the thread if necessary), and may proceed by calling the lock's Lock method, as will be explained in more detail below.

Figure 3:
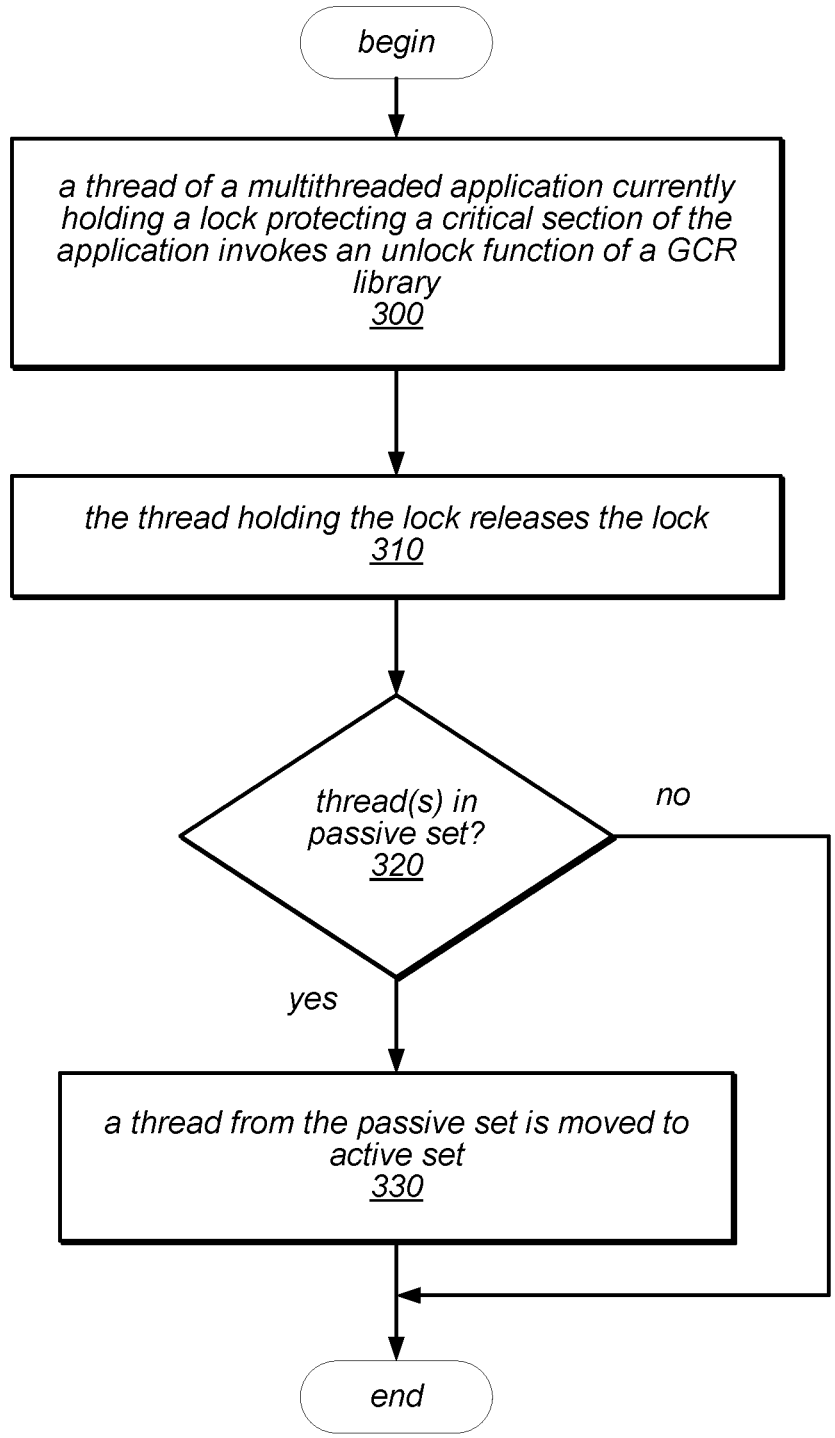
FIG. 3 is a flow diagram illustrating one embodiment of a method for moving a thread from a passive set to an active set as part of Generic Concurrency Restriction, as described herein.

One embodiment of a method moving a thread from a passive set to an active set as part of Generic Concurrency Restriction is illustrated by the flow diagram in FIG. 3. As illustrated in block 300, a thread of a multithreaded application that is currently holding the lock protecting a critical section may invoke an unlock function of the GCR library, according to some embodiments. The thread holding the lock may also release the lock, as in block 310. For example, in some embodiments a thread may release the lock by calling the lock's unlock method.

Additionally, when a thread invokes the GCR library's Unlock method, it may check whether it is time to signal the thread at the head of the passive queue to join the set of active threads, and therefore contend for the lock. In some embodiments, this may be done to achieve a long-term fairness, thereby preventing starvation of passive threads. In some embodiments, the GCR library may maintain a counter for the number of lock acquisitions and may use this counter to determine when to activate a passive thread (e.g., move a thread from the passive set to the active set). In other embodiments, GCR may utilize other mechanisms to ensure long-term fairness and/or to prevent starvation of passive threads, such as by using a timer-based approach.

Thus, if there are threads in the passive set, as indicated by the positive output of decision block 320, a thread from the passive set (e.g., the thread at the head of the queue) may be moved to the active set, as in block 330, and may then contend for the lock, according to some embodiments.

While described herein mainly in regard to mutual exclusion locks, the concepts, methods, mechanisms and techniques described herein may apply to other synchronization constructs, such as read-write locks, condition variables, semaphores, etc. In general, the methods, mechanisms and techniques described herein regarding Generic Concurrency Restriction may apply to virtually any form of synchronization construct, according to various embodiments. Additionally, the concepts, methods, mechanisms and techniques described herein may, in some embodiments, be made non-uniform memory access (NUMA) aware. For instance, when deciding which thread to move from the passive set to the active set, a thread that is located on the same socket as the current holder of the lock may be chosen, thus potentially minimizing NUMA effects.

Technical Details

Figure 4:
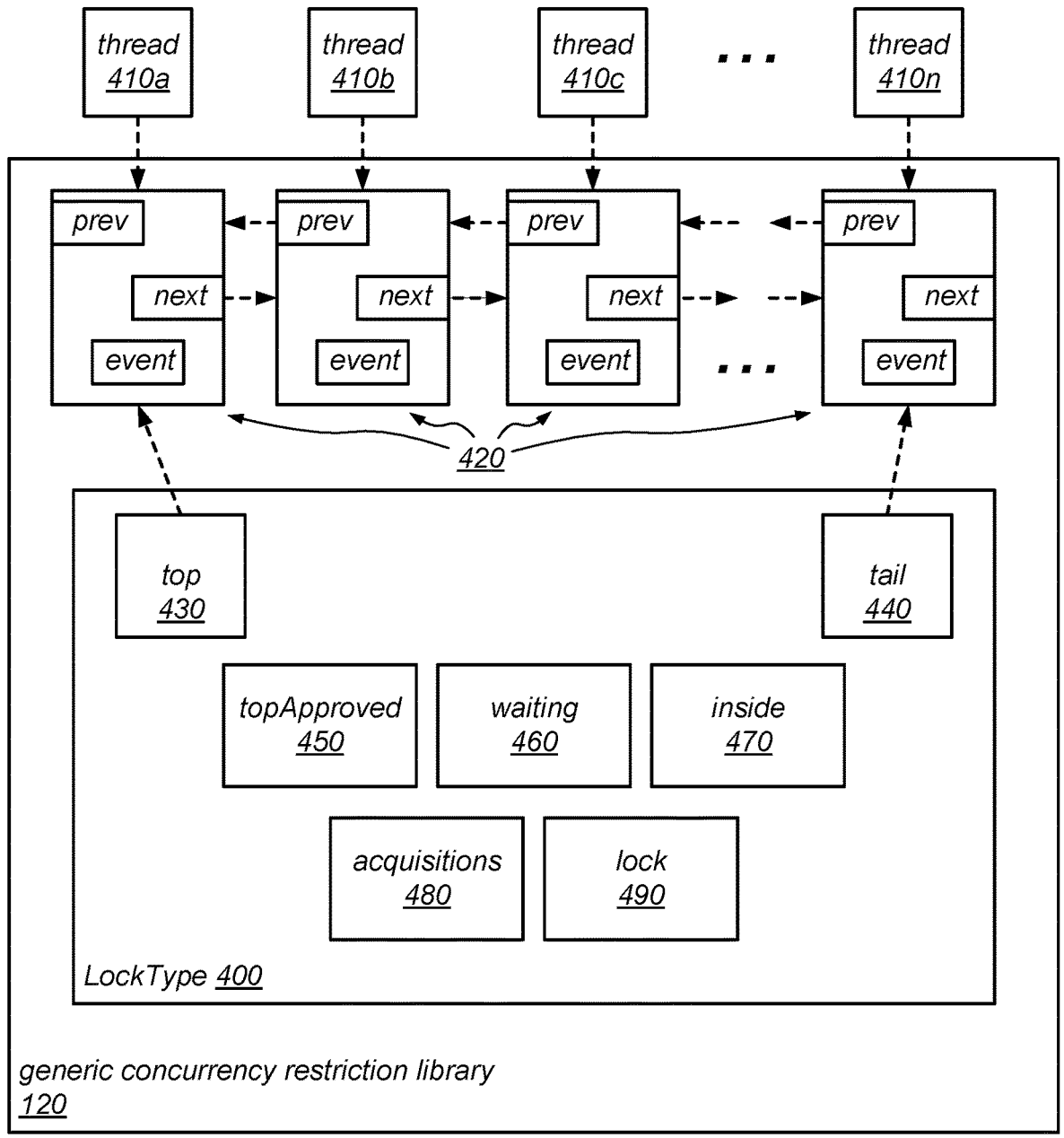
FIG. 4 is a block diagram illustrating elements of a generic concurrency restriction library, according to one embodiment.

FIG. 4 is a logical diagram illustrating various elements of a Generic Concurrency Restriction library, as described herein according to one embodiment. As shown in FIG. 4, a GCR library may include a LockType structure including various elements related to the underlying lock and to maintaining active and passive sets of threads. For example, GCR library 120 may include LockType 400, which in turn may include pointers to a queue holding the passive set of threads. For instance, LockType 400 may include top 430 and tail 440 pointer to the head and tail nodes of the passive queue. In the FIG. 4, the passive queue is represented by the set of nodes 420, each associated with one of the threads 410a-n. For example, when a thread 410 is added (or adds itself) to the passive queue, it is associated with a particular node 420 and may utilize that node to determine its current position (whether it is the first, last, or only thread) in the passive queue.

As noted above, in some embodiments, the passive set of threads may be maintained in a linked list-based queue structure (e.g., represented by nodes 420 in FIG. 4). For example, each node in the passive queue may include a previous pointer to the previous node in the list (e.g., the node closer to the head of the queue) and a next pointer to the next node in the list (e.g., the node closer to the tail of the queue). Additionally, in some embodiments, each node 420 may also include event information indicating any of various types of events (e.g., such as when the node becomes the head node of the queue).

LockType 400 may also include a flag, topApproved 450, which may be used to indicate, or signal, the first thread in the passive set (e.g., thread 410a in FIG. 4) that it may join the active set and therefore contend for the lock. LockType 400 may also include a counter, waiting 460, indicating the number of threads in the active set that are waiting (e.g., contending) to acquire the lock. LockType may also include a flag, inside 470, indicating whether the underlying lock is currently being held by a thread. LockType 400 may also include a counter, acquisitions 480, indicating the number of times the underlying lock has been acquired by threads of the multithreaded application. LockType 400 may also include lock 490, which may include various metadata to be passed to the underlying Lock and/or Unlock functions, according to some embodiments.

Additionally, the various elements of a GCR library illustrated in FIG. 4 are illustrated as example auxiliary data structures that may be used by a GCR library, according to one embodiment, as in the following example pseudocode:

```
typedef struct __Node {
    struct __Node * next;
    struct __Node * prev;
    int event;
} Node;
typedef struct {
    lock_t internalMutex;
    Node * top;
    Node * tail;
    int topApproved;
    int waiting;
    int inside;
    int numAcqs;
} LockType;
static int (*nextLock) (lock_t *);
static int (*nextUnlock) (lock_t *);
```

As shown in the above example pseudocode, the Node structure may represent a node in a queue of passive threads. In addition to the successor and predecessor nodes in the list, the Node structure may include an event flag that may be used to signal a thread when its node moves to the head of the queue, according to some embodiments.

As noted above regarding FIG. 4, the LockType structure may include internal (e.g., underlying) lock metadata (e.g., that may be passed to the Lock and Unlock functions of that lock) as well as (possibly) a number of additional fields, such as:

- top and tail pointers to the first (e.g., the head) and last (e.g., the tail) nodes, respectively, in the queue of passive threads.
- topApproved may be a flag used to signal the passive thread at the top of the queue that it may join the set of active threads.
- waiting may be a counter of the number of active threads waiting to acquire the lock.
- ins ide may be a flag (e.g., a Boolean flag) indicating whether the lock is held by some thread. Note that this field may not be needed if the underlying lock provides a mechanism indicating whether the lock is currently held (e.g., a method that queries whether the lock is currently held).
- numAcqs may be a counter indicating the number of lock acquisitions and may be used to move threads from the passive set to the active set.

In addition to the LockType structure, a GCR library may use a nextLock (nextUnlock) function pointer, which may be initialized to the Lock (Unlock, respectively) function of the underlying lock. The initialization code of the LockType structure, which may be considered straightforward (e.g., on Linux it may use the dlsym system call), is not discussed in detail herein.

Figure 5:
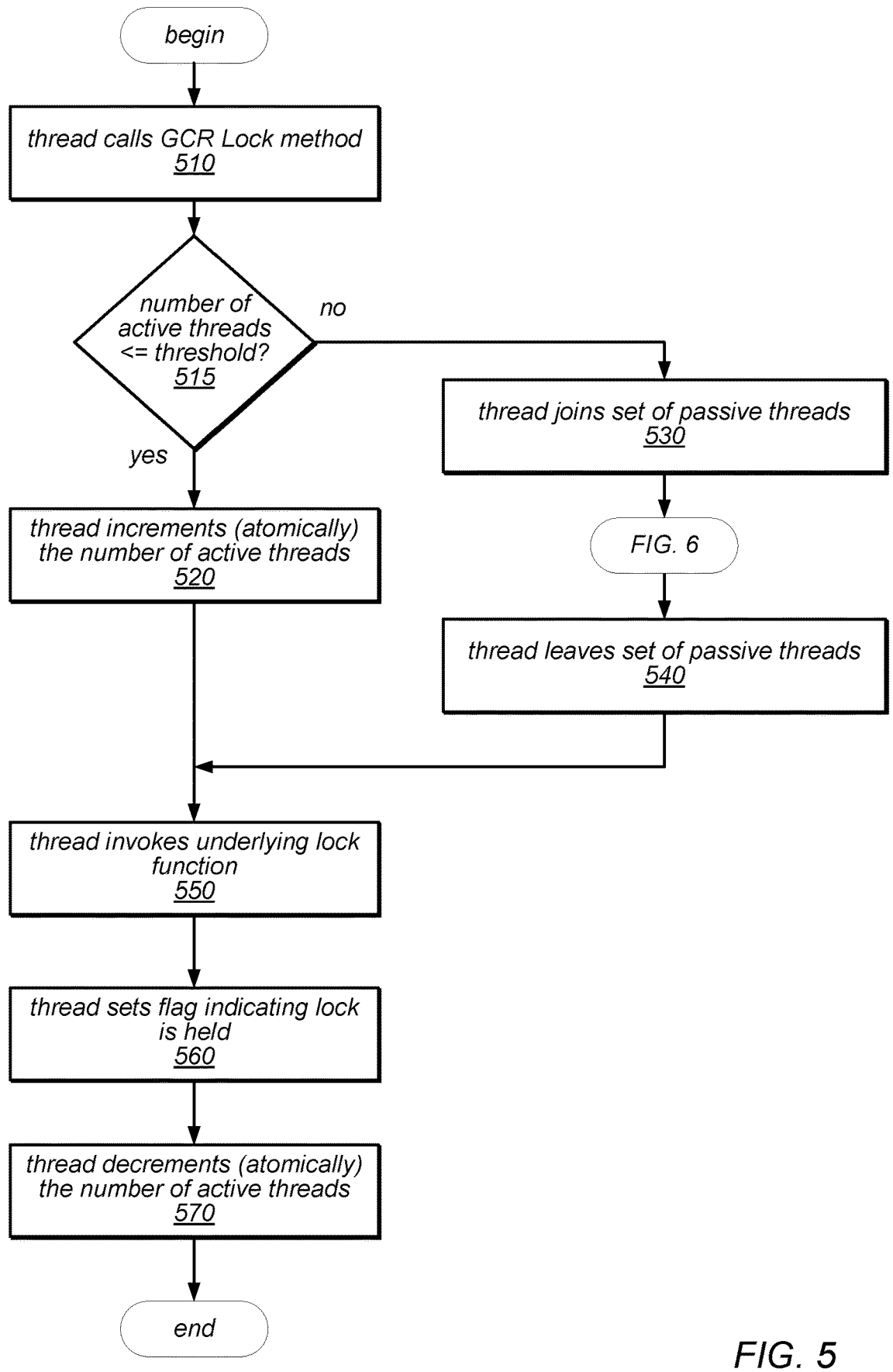
FIG. 5 is a flow diagram illustrating one embodiment of a method for a lock function implemented by generic concurrency restriction, as described herein.

FIG. 5 is a flowchart illustrating one embodiment of a method for a GCR library Lock function, as described herein. As illustrated in block 510, a thread of the multi-threaded application may call the Lock function of the CGR library. If, as indicated by the positive output of decision block 515, the number of active threads is less than or equal to the threshold, the thread may proceed to atomically increment the number of active threads, as in block 520.

The thread may then invoke the underlying lock's lock function to acquire the actual lock, as in block 550. In some embodiments, the thread may pass one or more pieces of metadata, such as lock 490, to the underlying lock function. The exact nature, content and/or format of the metadata may depend on the exact type of underlying lock being used and may vary from embodiment to embodiment.

Additionally, the thread may set a flag, such as inside 470, indicating that the lock is currently held, as in block 560 and may also atomically decrement the number of active threads, as in block 570. The thread may then proceed to perform any functionality that required holding the lock, such as executing its critical section, according to some embodiments.

If, however, the number of threads is greater than the threshold, as indicated by the negative output of decision block 215, the thread may join the set of passive threads, as in block 230. While a member of the passive set, the thread may wait until it is time for it to join the set of active threads, as will be described in more detail below regarding FIG. 6, before leaving the set of passive threads, as in block 240. A thread going to the passive set and waiting until it is able to join the active set may be referred to herein as being on the slow path to lock acquisition.

Figure 6:
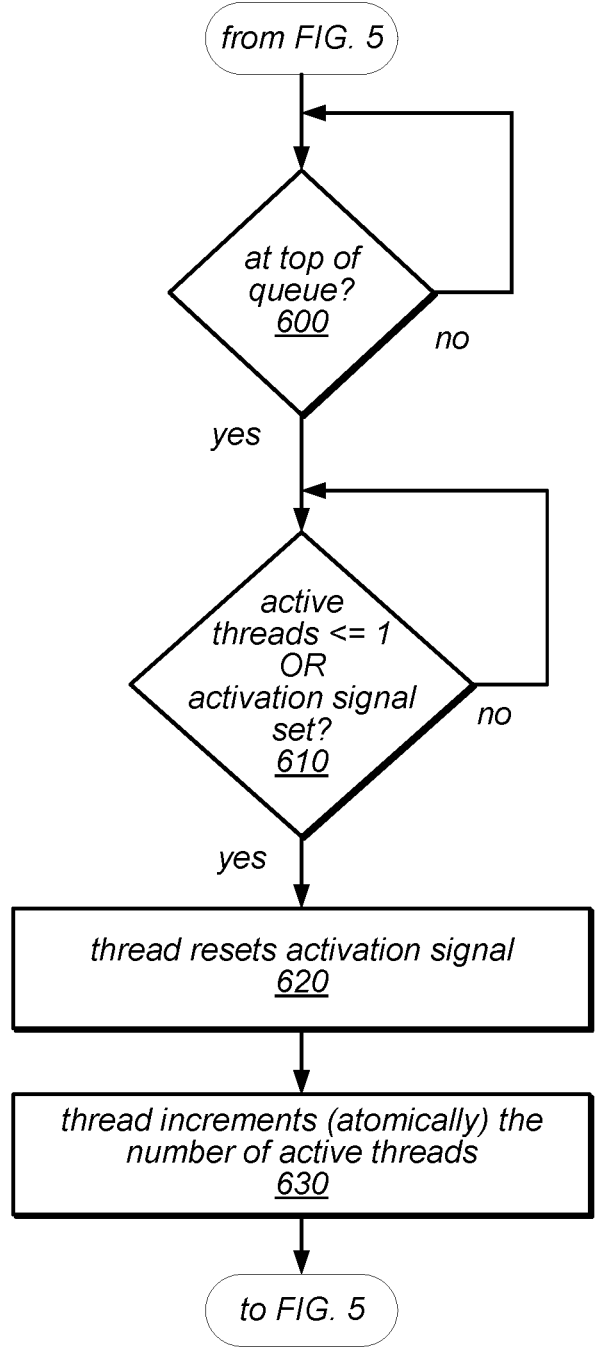
FIG. 6 is a flow diagram illustrating one embodiment of a method for a lock function implemented by generic concurrency restriction, as described herein.

FIG. 6 is a flowchart illustrating one embodiment of a method for a thread to join the passive set of threads as part of Generic Concurrency Restriction, as described herein. When a thread determines to join the passive set of threads, as described above regarding blocks 515 and 530 of FIG. 5, the thread may, after being added (or adding itself) to the queue of passive threads, wait until it is the first thread in the queue, as indicated by the positive output of block 600. For example, each thread in the passive set may be associated with (or hold) a particular node in a queue. When first added to the queue, the thread may be associated with the last (e.g., tail) node in the queue and may then wait until that node becomes the first (e.g., top or head) node in the queue.

Additionally, the thread may wait until the number of active threads is less than or equal to a predetermined/preconfigured threshold (e.g., indicating a maximum number of active threads) OR until it receives an activation signal, as indicated by the positive output of block 610. For instance, the thread, once at the head of the queue, may check (or monitor) waiting flag 460 and/or topApproved flag 450 in order to determine that it is time to join the active set, according to one embodiment. While illustrated in FIG. 6 as two separate wait loops, in some embodiments, the functionality represented by block 600 and 610 may be performed as part of a single wait loop.

Once the thread determines it is time to join the active set (e.g., as indicated by the positive output of block 610), it may reset the activation signal, such as by resetting topApproved flag 450, as in block 620. The thread may also atomically increment the number of active threads, such as by incrementing waiting flag 460, as in block 630, before removing itself from the passive queue, as described above regarding block 540 of FIG. 5.

One possible implementation of a GCR library Lock function, according to one embodiment, is illustrated by the example pseudocode below:

```
1.   int Lock(LockType *m) {
2.     /* if there is at most one active thread */
3.     if (m->waiting + m->inside <=1) {
4.       /* go to the fast path */
5.       FAA(&m->waiting, 1);
6.       goto FastPath;
7.     }
8.   SlowPath:
9.     /* enter the MCS-like queue of passive threads */
10.      Node *myNode = pushSelfToQueue(m);
11.      /* wait for my node to get to the top */
12.      while (!myNode->event) {
13.        /* spin, park or spin-then-park */
14.        Pause ( );
15.      }
```

-continued

```
16.      /* wait (by spinning) for active threads to leave
17.         or for a signal to join the set of active threads
         */
18.      while ((m->waiting || m->inside) && !m-
         >topApproved) Pause( );
19.      m->topApproved = 0;
20.      FAA(&m-waiting, 1);
21.      popSelfFromQueue(m, myNode);
22.    FastPath:
23.      int ret = nextLock(&m->internalMutex);
24.      m->inside = 1;
25.      FAA(&m->waiting, -1);
26.      return ret;
27.   }
```

As illustrated in the example pseudocode above, a thread may first check the current number of active threads (e.g. line 3). If this number is below the maximum allowed number of active threads (e.g., one in the above pseudocode), the thread increments (e.g., atomically, such as by using a fetch-and-add instruction) the number of active threads that wait to acquire the lock (e.g., line 5) and continues to the fast path (e.g., line 22). Note that the check in line 3 and the increment in line 5 may not be mutually atomic, that is, multiple threads may pass the condition in line 3 and thus increment the counter stored in waiting concurrently, according to some embodiments. However, this may only impact performance (as the underlying lock will become contended), but not correctness. Additionally, this situation should be rare when the system is in the steady state.

In the fast path, the thread may invoke the Lock function of the underlying lock (e.g., line 23). After it returns from that invocation, it may set the ins ide flag and then may decrement (e.g., atomically) the waiting counter (e.g., lines 24-25). One example slow path is illustrated by lines 8-21 in the above pseudocode. On the slow path, the thread may join the queue of passive threads (e.g., line 10)—an implementation of the pushSelfToQueue function is presented and described below. Next, the thread may wait until it reaches the top of the queue (e.g., lines 12-14). One of the waiting techniques employed by Generic Concurrency Restriction, as described herein, may be a parking technique. In general, a parking operation may quiesce or passivate the calling thread and voluntarily surrender the CPU on which the caller was executing, making that CPU immediately available to run other ready threads. If no other threads are ready, then the CPU may become idle and be able to drop to lower power states. In some embodiments, this may reduce power consumption and may enable other threads on the same chip to run at faster speeds via turbo-mode.

For simplicity, the example pseudocode above provides a variant that implements (local) spinning, however other forms of waiting are possible, such as a spin-then-park waiting strategy, according to various embodiments. For example, under a spin-then-park approach, threads may spin for a brief period (e.g., optimistically waiting) in anticipation of an event indicating that they have reached the head of the queue. Then, if no such event has occurred, they may revert to parking, as necessary. Under this policy, the spin period (which constitutes local spinning) may be set to the length of a context-switch round trip. More precisely, a thread may spin until I steps have passed or until a corresponding event occurs. In this example, I can be expressed in either units of wall-clock time or in a number iterations of a spin loop. If no event occurs within the period bounded by I, the thread may de-schedule itself by parking. In some embodiments, spin-then-park waiting strategies may provide some relief from context switching costs. However, spin-then-park strategies may not work well with strict first-in-first-out (FIFO) queue-based locks. With these types of locks, the next thread to be granted the lock may also be the one that has waited the longest, and is thus most likely to have exceeded its spin duration and reverted to parking. Conversely, the most recently arrived threads may be the most likely to still be spinning, but they will be the last to be granted the lock.

Once the thread reaches the top of the queue, it may monitor the number of active threads and the topApproved flag (e.g., line 18). When it finds no active threads (i.e., both waiting and inside are zero) or the topApproved flag is being set, it resets the latter (e.g., line 19) and increments (e.g., atomically) the waiting counter (e.g., line 20). Then it may remove itself from the queue of passive threads (e.g., line 21) and may continue with the code of the fast path. One example implementation of a popSelfFromQueue function is provided and discussed below.

Figure 7:
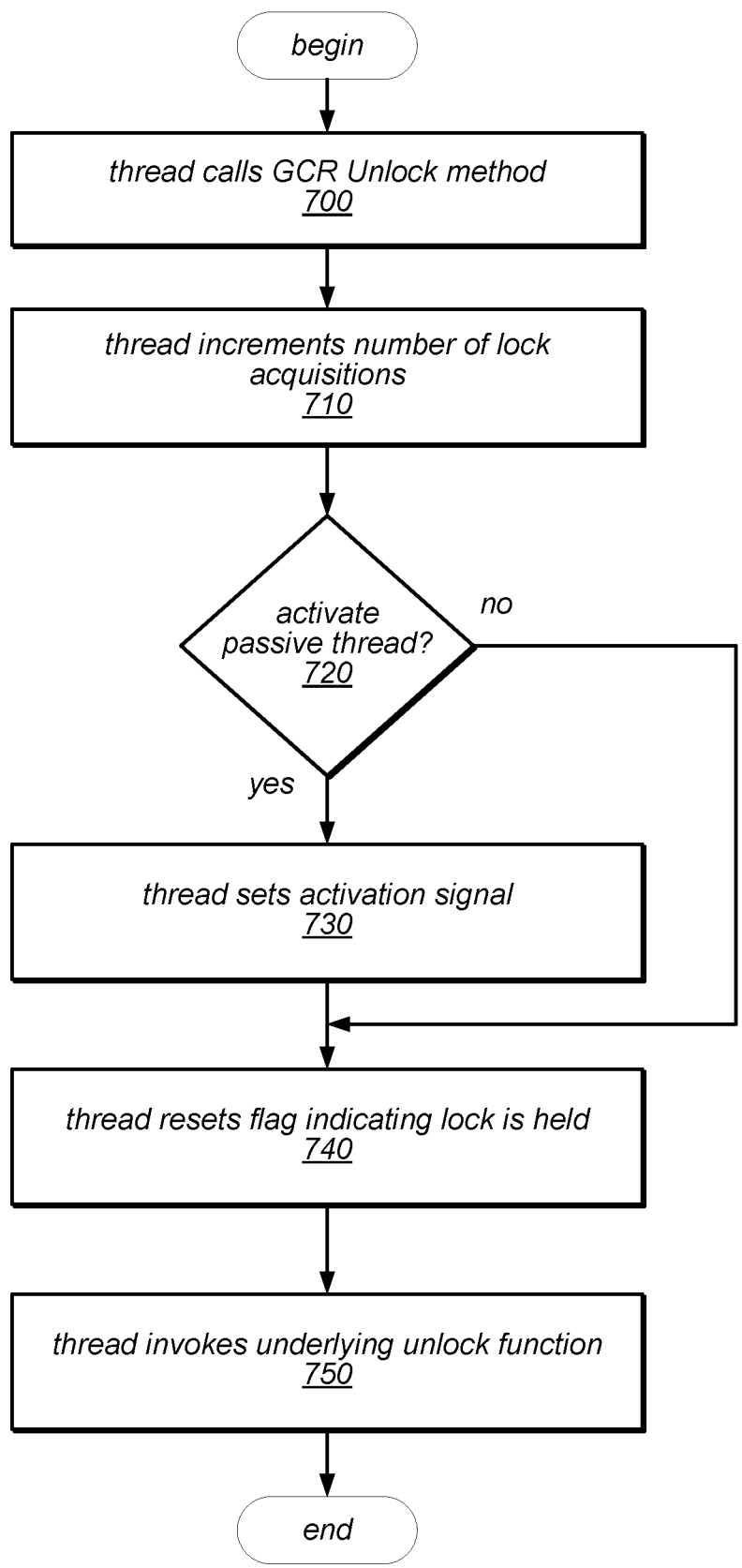
FIG. 7 is a flow diagram illustrating one embodiment of a method for a unlock function implemented by generic concurrency restriction, as described herein.

FIG. 7 is a flowchart illustrating one embodiment of a method for a GCR library Unlock function, as described herein. As illustrated in block 700, a thread of the multi-threaded application that currently holds the lock may call the Unlock function of the GCR library. The thread may then increment the number of lock acquisitions, as in block 710. For instance, in one embodiment, the thread, may increment the acquisitions counter 480, described above.

In some embodiments, a GCR library may utilize the number of lock acquisitions to determine when to activate a passive thread—that is when to allow a thread in the passive set to join the active set. If, as indicated by the positive output of decision block 720, it is time to activate a passive thread, the thread may set the activation signal indicating to the first thread in the passive set that it is time to join the active set, as in block 730. In some embodiments, the thread may set the topApproved flag 450 to signal the first thread in the passive set (e.g., the thread associated with the head node in the passive queue) that it is time to join the passive set.

The thread may also reset the flag indicating whether the underlying lock is currently held, as in block 740. For example, in one embodiment, the thread may set the inside flag 470 to indicate that the underlying lock is not (or no longer) currently held. Finally, the thread may invoke the underlying lock's unlock function to release the lock, as in block 750. In some embodiments, the thread may pass one or more pieces of metadata, such as lock 490, to the underlying unlock function. The exact nature, content and/or format of the metadata may depend on the exact type of underlying lock being used and may vary from embodiment to embodiment.

One example implementation of a GCR library Unlock function is illustrated by the pseudocode below, according to one embodiment:

| | |
|---|---|
| 28. | int Unlock (LockType * m) { |
| 29. | /* time to move activate a passive thread */ |
| 30. | if (((m->numAcqs++ % THRESHOLD) == 0) && m->top != NULL) { |
| 31. | /* signal the selected thread that it is good to go */ |
| 32. | m->topApproved = 1; |
| 33. | } |
| 34. | m->inside = 0; |
| 35. | /* call underlying lock */ |
| 36. | return nextUnlock(&m->internalMutex); |
| 37. | } |

As illustrated by the example pseudocode above, a thread may increment the numAcqs counter and check whether it is time to bring a passive thread to the set of active threads (e.g., line 30). In some embodiments, the decision to activate a thread (e.g., move a thread from the passive set to the active set) may be based on the number of lock acquisitions. In other embodiments, other approaches may be used. Afterwards, the thread may reset the inside flag (e.g., line 34) and may call the Unlock function of the underlying lock (e.g., line 36).

Figure 8:
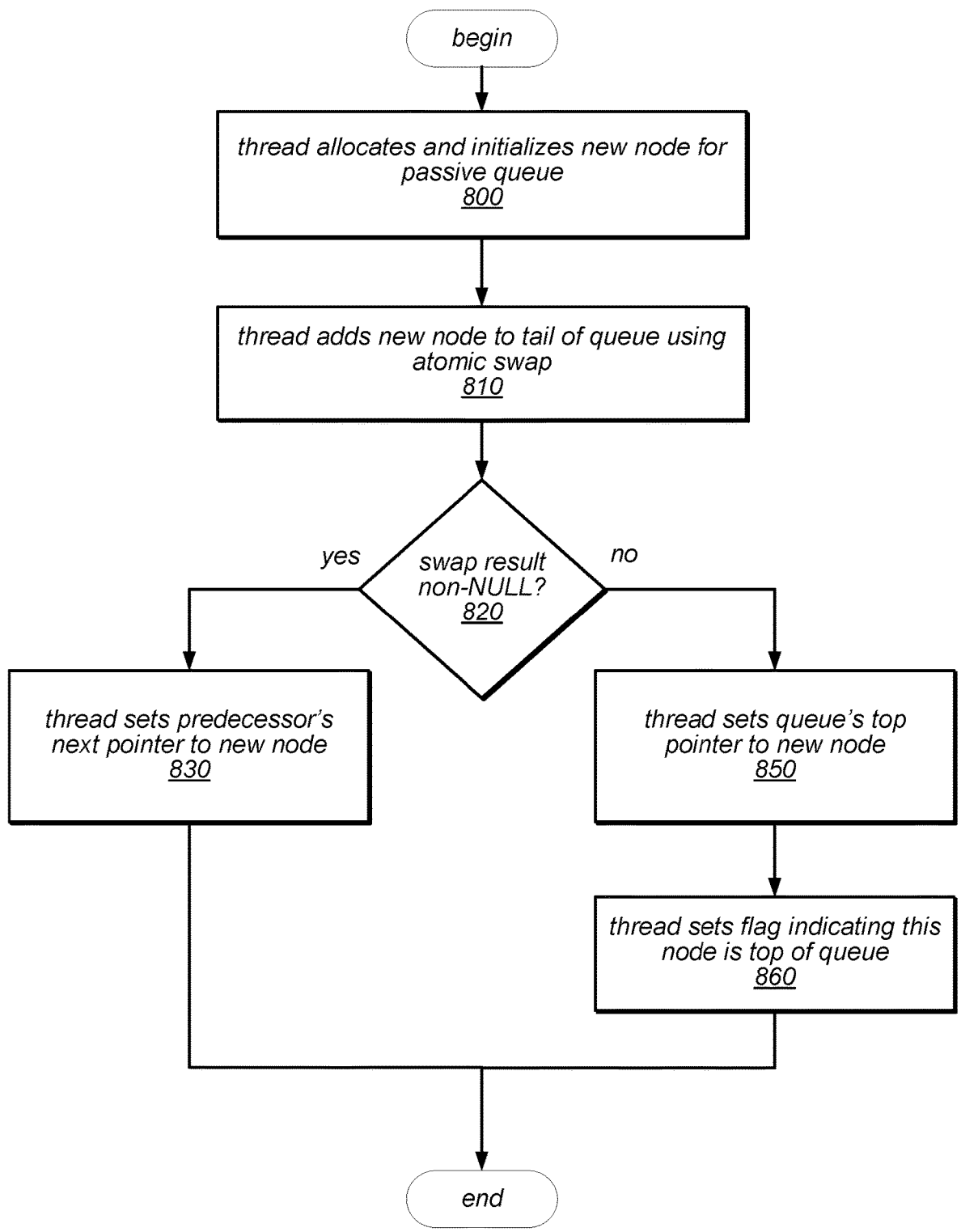
FIG. 8 is a flow diagram illustrating one embodiment of a method for a adding a thread to a queue of passive threads as part of generic concurrency restriction, as described herein.

FIG. 8 is a flowchart illustrating one embodiment of a method for adding a thread to a passive queue, as described herein. As illustrated by block 800, a thread may allocate and initialize a new node, such as a node 420, for the passive queue and may add the new node to the tail of the queue using an atomic SWAP method, as in block 810. If as indicated by the positive output of decision block 820, the SWAP result is not null, the thread may set the predecessor node's next pointer to the new node, as in block 830, thus adding the new node (e.g., the current thread's node) after the predecessor node in the queue. For example, if thread 410n was adding itself to the queue, it may generate (e.g., allocate and/or initialize) a new node and update the existing tail node's next pointer to the new node.

In some embodiments, nodes may be reused over and over again for different threads in the passive queue. Thus, a thread may only initialize an unused (e.g., previously allocated and used) node rather than allocating a completely, new node. For instance, in some embodiments, a thread may obtain a node from a pool of nodes available for reuse.

If, however, the SWAP result is NULL, as indicated by the negative output of decision block 820, the thread may set the queue's top (e.g., head) pointer to the new node, as in block 850, according to some embodiments. For example, if the passive set is currently empty, as indicated by the fact that the SWAP returned NULL, the thread may then add itself as the top (e.g., the head) node in the queue, since it will be the only thread in the queue. The thread may also set a flag indicating that this new node is the top (e.g., head) node in the queue, as in block 860. For example, in one embodiment, the thread may utilize the event flag within the node to indicate whether the node is currently the top (e.g., head) node in the queue.

One example implementation, according to one embodiment, for inserting a thread to the queue of passive threads is illustrated in the example pseudocode below:

| | |
|---|---|
| 38. | Node *pushSelfToQueue(LockType * m) { |
| 39. | Node * n = (Node *)malloc(size of (Node)); |
| 40. | n->next = NULL; |
| 41. | n->event = 0; |
| 42. | Node * prv = SWAP (&m->tail, n); |
| 43. | if (prv != NULL) { |
| 44. | prv->next = n; |
| 45. | } else { |
| 46. | m->top = n; |
| 47. | n->event = 1; |
| 48. | } |
| 49. | return n; |
| 50. | } |

As illustrated in the above pseudocode, in order to insert itself into the queue, a thread may allocate and initialize a new node (e.g., lines 39-41). In some embodiments, node objects may be cached and reused in a thread-local pool, such as to amortize memory management time. Then, the thread may swap (e.g., atomically) the tail of the queue with the newly created code (e.g., line 42). If the result of the swap is non-NULL, the thread's node is not the only node in the queue and the thread may update the next pointer of its predecessor (e.g., line 44). Otherwise, the thread may set the top pointer to its newly created node (e.g., line 46) and may set the event flag (e.g., line 47). The latter may be done to avoid spinning (endlessly) at line 12.

Figure 9:
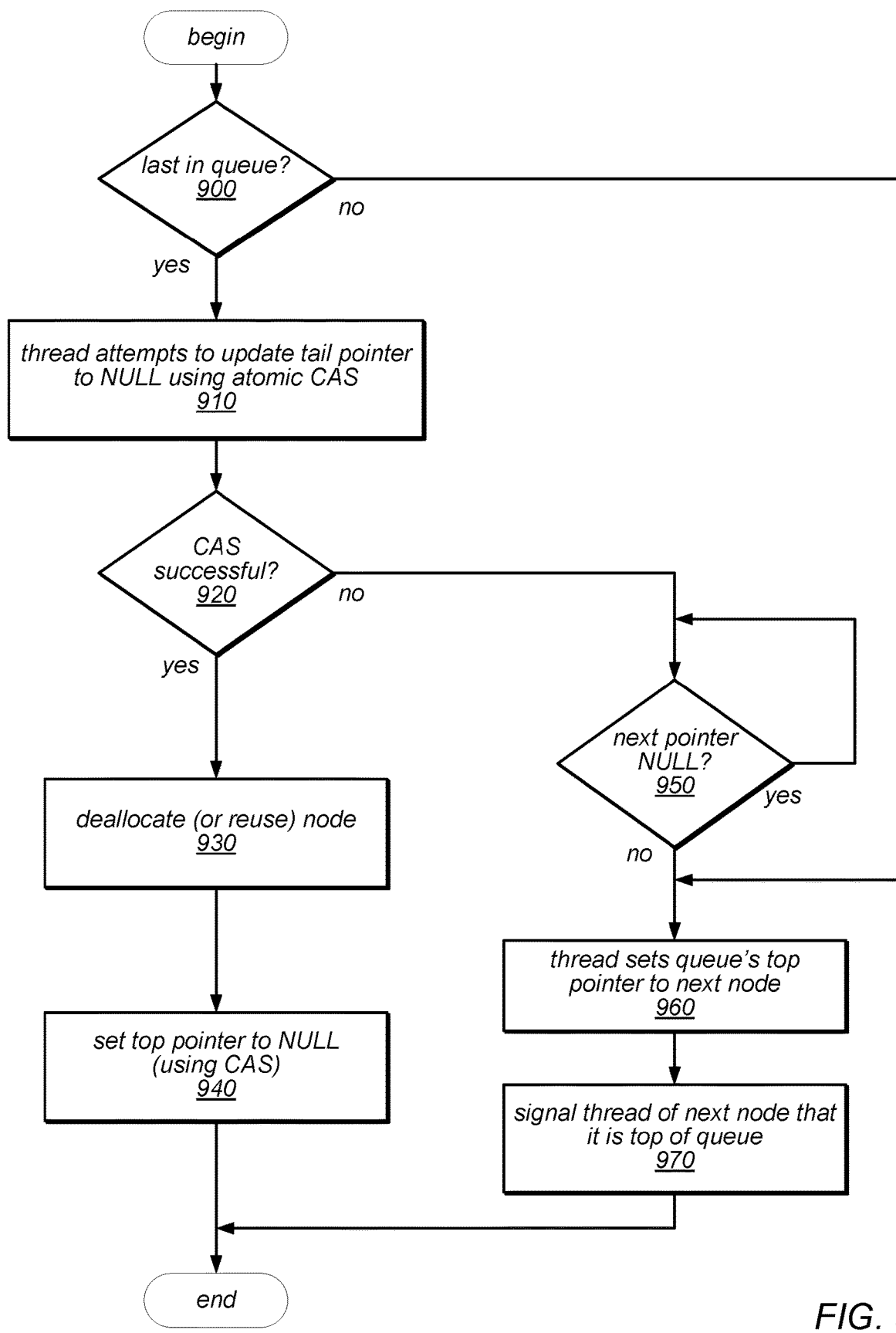
FIG. 9 is a flow diagram illustrating one embodiment of a method for a removing a thread from a queue of passive threads as part of generic concurrency restriction, as described herein.

FIG. 9 is a flowchart illustrating one embodiment of a method for removing a thread at the top of the passive queue from the queue, as described herein. If, as illustrated by the positive output of decision block 900, the thread is currently the last (e.g., the only) thread in the queue (e.g., the thread is associated with the tail node), the thread may attempt to update the tail pointer to NULL using an atomic compare-and-swap (CAS) instruction, as in block 910.

If the compare-and-swap instruction is successful, as indicated by the positive output of decision block 920, the thread may deallocate (or reuse) the node, as in block 930. In some embodiments, nodes may be reused over and over again for different threads in the passive queue. Thus, rather than deallocate (e.g., free) a node, the thread may simply remove the node from the queue and then store the node in a pool of nodes for subsequent available for reuse, according to some embodiments. The thread may then update the queue's top (e.g., head) pointer to point to NULL, using another CAS instruction, as in block 940.

Alternatively, if the thread's attempt to update the queue's tail pointer using a CAS was unsuccessful, as indicated by the positive output of decision block 920, the thread may then wait until the next pointer is not null, as in decision block 950. For instance, a failure of the CAS operation of block 910 may indicate that another node was added to the queue at the same time (e.g., concurrently by another thread of the multithreaded application) that the current thread is trying to remove itself from the queue. Thus, the current thread may wait until the next pointer of its node is updated. Since the current thread's node is the last (e.g., tail) node in the queue, if another thread is adding a node to the queue, it will be added after the current thread's node, according to some embodiments.

Note that according to some embodiments, the thread only removes itself from the queue once it has become the first thread (e.g., associated with the top, or head, node of the queue). Thus, the thread may set the queue's top (e.g., head) pointer to point to the next node as in block 960. The thread may update the queue's top pointer if the thread determined (e.g., at block 900) that is was not the last node in the queue, as indicated by the negative output of decision block 900, or if the thread determined that the queue was concurrently updated (e.g., another node was added), as indicated by the negative output of decision block 920.

Additionally, the thread may signal the successor that it is now the new top (e.g., head) node of the queue, as in block 970. For example, in one embodiment, the thread may use the event flag in the node 420 to inform the new first thread of its new position (e.g., that it is associated with the top node in the queue).

One example implementation, according to one embodiment, for removing a thread from the queue of passive threads is illustrated in the example pseudocode below:

```
51.   void popSelfFromQueue(LockType * m, Node * n) {
52.     Node * succ = n->next;
53.     if (succ == NULL) {
54.       // my node is the last in the queue
55.       if (CAS (&m->tail, n, NULL)) {
56.         free(n);
57.         CAS (&m->top, n, NULL);
58.         return;
59.       }
60.       // rarely taken path : latency-tardy store into n->next
61.       for (;;) {
62.         succ = n->next;
63.         if (succ != NULL) break;
64.         Pause( );
65.       }
66.     }
67.     m->top = succ;
68.     succ->event = 1;
69.     free(n);
70.   }
```

As illustrated in the above pseudocode, when removing a thread from the queue, the thread may check first whether its node is the last in the queue (e.g. line 53). If so, it may attempt to update the tail pointer to NULL, such as by using an atomic compare-and-swap (CAS) instruction (e.g., line 55). If the CAS succeeds, it may deallocate (or reuse) the thread's node (e.g., line 56). The removal operation may be completed by setting the top pointer to NULL as well (e.g., line 57). Note that a CAS may be needed (rather than a simple store) when setting top pointer to NULL, because the top pointer may have already been updated concurrently in line 46. This CAS, however, should not be retried if failed, according to some embodiments, since a failure may mean that the queue is not empty anymore and then the thread should not try to set top to NULL again.

Note that, in this and other examples, the "CAS" primitive may represent an atomic compare-and-swap type operation in which the first argument is the memory location, the second argument is the comparand, and the final argument is the value to which the memory location should be set if the content of the memory location equals the comparand. As is apparent from the above example pseudocode, the CAS operation in line 55 may return true or false indicating the success of the CAS.

If the CAS in line 55 is unsuccessful, the thread may realize that its node is no longer the last in the queue, that is, the queue has been concurrently updated in line 42. As a result, it may wait (e.g., in the for-loop in lines 61-65) until the next pointer of its node is updated in line 44. Finally, after finding that its node is not the last in the queue (whether immediately, as in line 53, or after the failed CAS in line 55), the thread may update the top pointer to its successor in the queue (e.g., line 67) and may signal the successor (e.g., line 68) to stop waiting in the while-loop (e.g., as in line 12).

Evaluation

The following section describes a preliminary evaluation of GCR, according to some embodiments. For the evaluation, GCR was implemented, according to one embodiment, as a stand-alone library conforming to the pthread mutex lock API defined by the Portable Operating System Interface (POSIX) standard. Thus, any software that uses this standard API may be able to utilize GCR without any code change, or even without recompilation. Additionally, a classic FIFO MCS lock was also implemented as a stand-alone library. The performance of the MCS lock with, and without, the use of GCR was compared. The latter configuration (i.e., MCS with the use of GCR) will be referred to herein as GCR+MCS.

Prior work shows that a lock admission waiting policy, that is the way a thread waits for its turn to acquire the lock, can have a substantial performance impact. For the MCS lock, two options were utilized during the evaluation—(local) unbounded spinning and spin-then-park policies. The evaluation illustrates, according to some embodiments, that the MCS lock may perform better with local spinning, possibly due to high administrative cost of parking and unparking threads. Thus, only results for the MCS variant in which waiting threads perform unbounded local spinning are shown. Note that for GCR, the spin-then-park policy for passive threads may be used since their transition to the set of active threads may be expected to be very infrequent, in some embodiments. Thus, the cost of parking and unparking threads may be amortized and compensated by conserving computing resources for active threads.

Evaluations were performed using an AVL tree microbenchmark. The AVL tree data structure supports operations for inserting, removing and looking up keys stored in the tree. After initial warmup, all threads are synchronized to start running at the same time, and apply randomly chosen operations with randomly chosen keys on the AVL tree for 5 seconds. At the end of the time period, the total number of operations is calculated, and the throughput reported.

The microbenchmark used for the evaluation supports a variable key range from which keys are drawn for tree operations. The results are shown for the setting in which the key range is set to 2048 and threads perform 60% look up operations, while the rest is split evenly between inserts and removes. The tree is pre-initialized to contain roughly half of the key range.

The evaluation has been performed on two different architectures, namely a single-socket Oracle T4 (Sparc-based) server, power by Solaris 11 OS and able to run up to 64 hardware contexts, and a dual-socket Oracle X5 (x64-based) server, powered by Ubuntu 15.04 OS and able to run up to 72 hyper-threads. The reported results are the mean of 5 runs performed in the configuration.

Figure 10A:
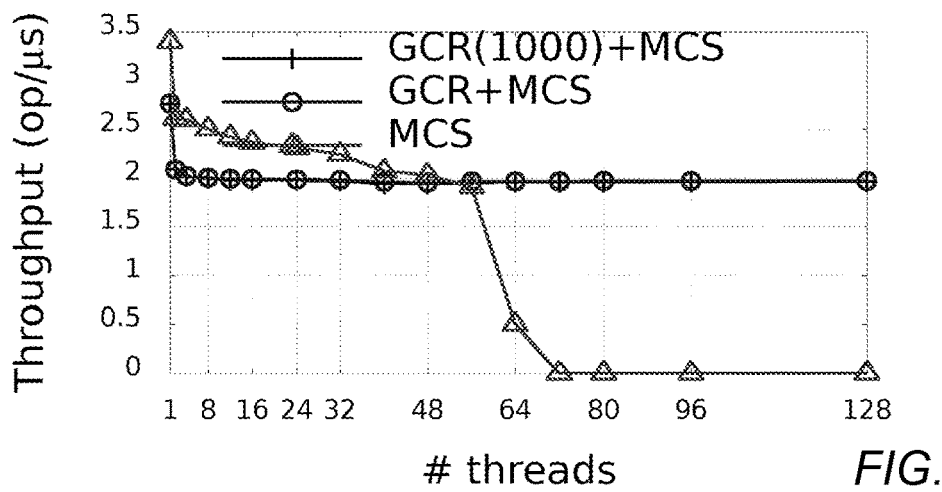
FIGS. 10A, 10B and 10C illustrate results of an evaluation of one embodiment of generic concurrency restriction, as described herein.
Figure 10B:
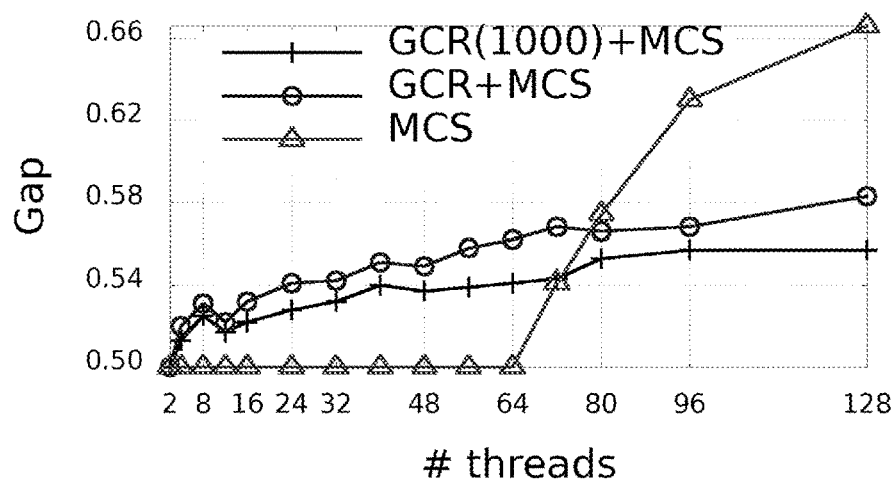
Figure 10C:
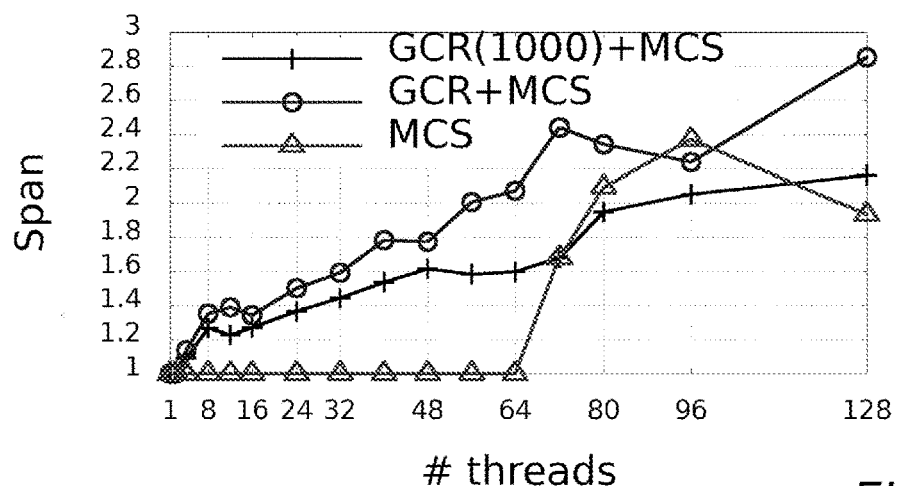

FIGS. 10A, 10B and 10C show the results for the T4 server. As illustrated in FIG. 10A, MCS beats GCR+MCS by up to 25% for a low number of threads. Once the number of threads exceeds the capacity of the machine, however, the throughput achieved with MCS crashes to almost zero. This is because the MCS lock is passed between all threads in a FIFO order, regardless of whether those threads are scheduled to run. Thus, when there are more threads than the number of available hardware contexts, quite often the lock holder happens to be context-switched. The GCR+MCR lock, however, delivers stable performance regardless of the number of threads. This is because this lock keeps all passive threads parked and thus not consuming system resources, while keeping active thread(s) ready to acquire the lock as long as the lock becomes available.

It is natural to ask how the fairness of the MCS lock is affected once the GCR library is used. There are many ways to assess fairness; FIGS. 10B and 10C provide two such statistics. To produce these charts, the number of operations reported by each thread (at the end of the run) are sorted. FIG. 10B shows the mean portion (calculated over 5 runs) of operations completed by the upper half of threads. This ratio is denoted as gap. Along with that, FIG. 10C shows span, which is the mean ratio between the maximum and minimum number of operations per thread.

Given that MCS is a strictly fair FIFO lock, each thread performs roughly the same number of operation with this lock. This is apparent from results in FIGS. 10B and 10C, which show the gap of 0.5 and the span of 1 for thread counts up to 64. The difference between threads becomes more apparent when the number of threads exceeds the machine capacity. This is because the total number of operations as well as the number of operations performed by each thread are very low. Along with that, GCR+MCS achieves the gap of less than 0.6 for all thread counts. While the span is growing with the number of threads, it shows that none of the threads is starving.

The GCR algorithm may provide a feature allowing for fairness to be adjusted, or tuned. For instance, in some embodiments, the frequency with which threads are moved from the passive set to the active one may be adjusted. One results of this fairness tuning is illustrated in FIGS. 10A, 10B and 10C, with GCR(1000)+MCS curve, corresponding to the GCR algorithm in which THRESHOLD is set to 0x1000. There, GCR(1000)+MCS achieves better gap and span compared to GCR+MCS. At the same time, the throughput achieved by GCR(1000)+MCS is also slightly lower (cf. FIG. 10A). Thus, as commonly happens with many locks and other synchronization algorithms, this knob (e.g., adjusting the frequency at which threads are moved from the passive set to the active set) may control the tradeoff between fairness and performance.

Figure 11A:
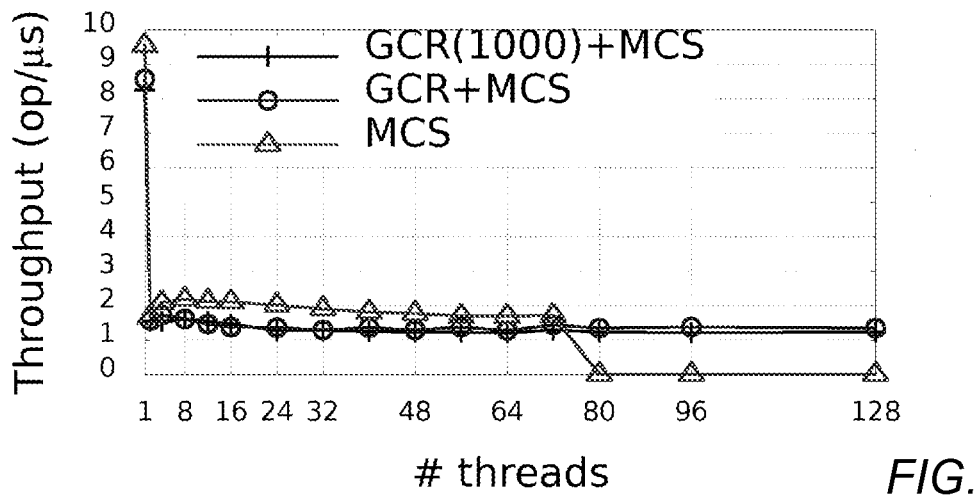
FIGS. 11A, 11B and 11C illustrate results of an evaluation of one embodiment of generic concurrency restriction, as described herein.
Figure 11B:
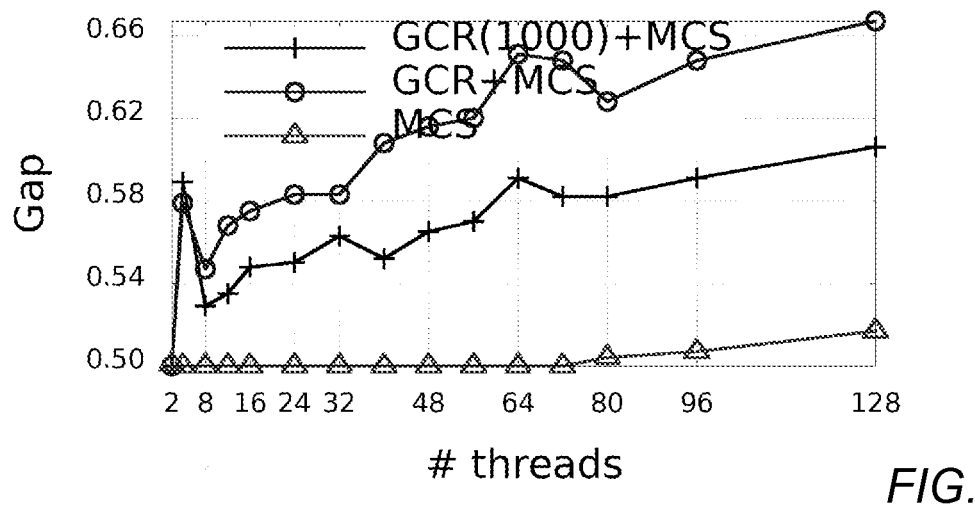
Figure 11C:
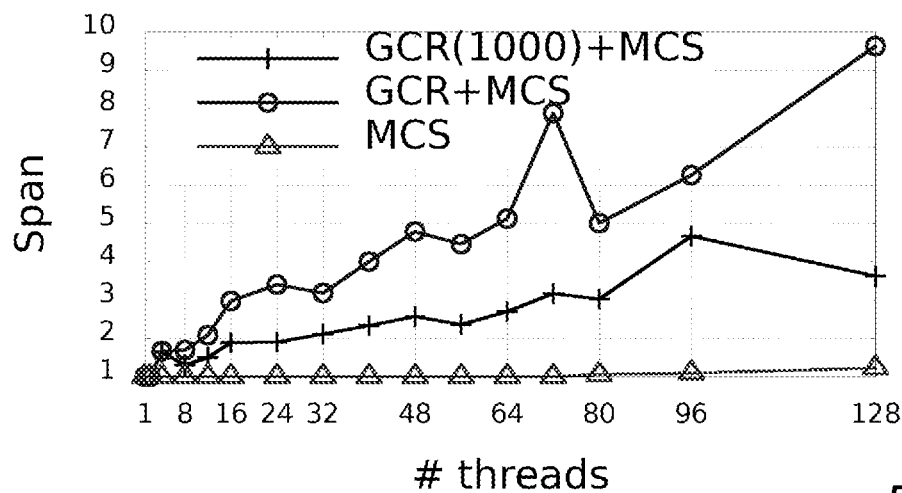

The results for the X5 server are shown in FIGS. 11A, 11B and 11C. In general, they depict similar behavior as discussed with respect to FIGS. 10A, 10B and 10C, above.

Example System

Figure 12:
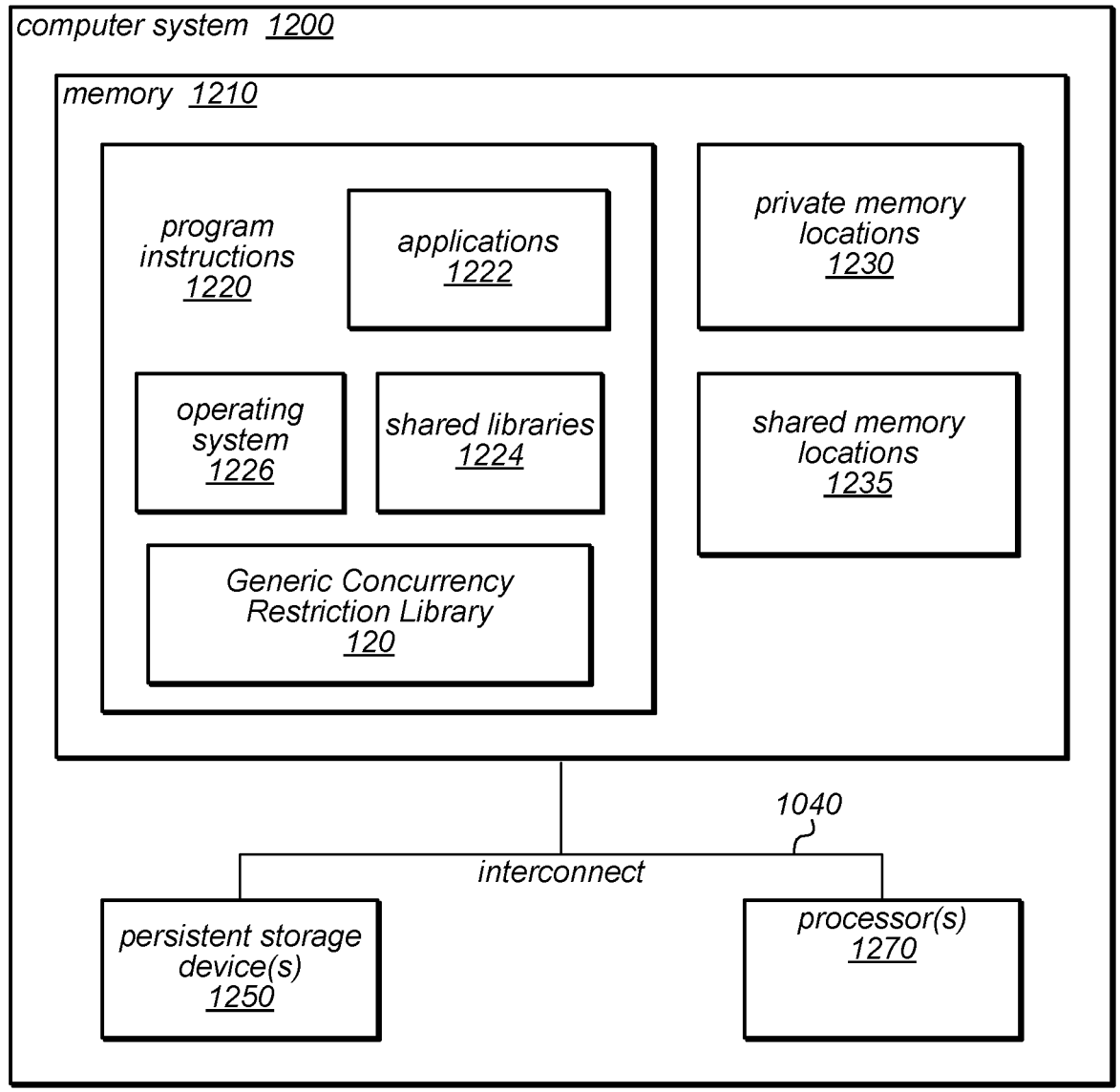
FIG. 12 is a logical diagram illustrating a system configured to implement generic concurrency restriction, according to one embodiment.

FIG. 12 illustrates a computing system configured to implement some or all of the methods described herein for Generic Concurrency Restriction, according to various embodiments. The computer system 1200 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing Generic Concurrency Restriction, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1200 may include one or more processors 1270; each may include multiple cores, any of which may be single or multi-threaded. The computer system 1200 may also include one or more persistent storage devices 1250 (e.g. optical storage, magnetic storage, hard drive, tape drive, solid state memory, etc) and one or more system memories 1210 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

The one or more processors 1270, the storage device(s) 1250, and the system memory 1210 may be coupled to the system interconnect 1240. One or more of the system memories 1210 may contain program instructions 1220. Program instructions 1220 may be executable to implement one or more applications 1222 (which may include one or more threads requiring access to a lock protecting a critical section of one of the applications), shared libraries 1224 (which may include GCR library 120), or operating systems 1226. Program instructions 1220 may be encoded in platform native binary, any interpreted language such as Java™ byte-code, or in any other language such as C/C++, Java™, etc or in any combination thereof. The program instructions 1220 may include functions, operations and/or other processes for implementing Generic Concurrency Restriction, as described herein. Such support and functions may exist in one or more of the shared libraries 1224 (such as GCR library 120), operating systems 1226, or applications 1222, in various embodiments. The system memory 1210 may further comprise private memory locations 1230 and/or shared memory locations 1235 where data may be stored. For example, shared memory locations 1235 may store data accessible to concurrently executing threads, processes, or transactions, in various embodiments. In addition, the system memory 1210 may, at various times, store lock metadata (e.g., lock state information or lock structure header information, identifiers of successor threads, and/or various counters or flags, as described herein), threshold values, policy parameter values, maximum count values, lists or queues of pending, active, and/or passive threads, lists of locks currently held by particular threads, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of locks and structures and particular locking algorithms and policies, it should be noted that the techniques and mechanisms disclosed herein for implementing Generic Concurrency Restriction may be applicable in other contexts in which critical sections of code and/or shared resources may be protected by other types of locks/structures under different locking algorithms/policies than those described in the examples herein. It is intended that the following claims be interpreted to embrace all such variations and modifications.

What is claimed is:

1. A computer-implemented method, comprising:
   invoking, by a thread of a multithreaded application holding a lock, an Application Programming Interface (API) to release the lock; and
   performing, responsive to invoking the API, by a function of a generic concurrency restriction library complying with the API that wraps another library complying with the API:
   transitioning another thread passively waiting on the lock to actively contending for the lock, comprising:
   removing the other thread from a passive set of threads; and
   causing execution, by the other thread, of a lock function of the other library to allocate the lock; and
   executing a release function of the other library to release the lock.

2. The method of claim 1, further comprising: allocating the lock, by the thread prior to invoking the API to release the lock, comprising setting, within the function of the generic concurrency restriction library, a lock flag to indicate that the lock is held.

3. The method of claim 2, further comprising: passively waiting on the lock, by the other thread responsive to determining, according to the lock flag, that the lock is held and that a number of threads actively contending for the lock exceeds a threshold.

4. The method of claim 3, wherein transitioning the other thread passively waiting on the lock to actively contending for the lock comprises: signaling, by the thread, an indication that the other thread should be activated based at least in part on determining that the number of threads actively contending for the lock does not exceed the threshold; and joining, by the other thread in response to the signal, an active set of threads contending for the lock, comprising atomically incrementing a counter representing the number of threads actively contending for the lock.

5. The method of claim 1, wherein actively contending for the lock comprises invoking a lock function of the other library.

6. The method of claim 1, further comprising: performing, by the lock function of a generic concurrency restriction library executed by a given thread: determining whether the given thread should be placed in an active set of threads associated with the lock, wherein threads in the active set are able to contend for the lock; in response to determining that the given thread should be placed in the active set, executing the lock function of the other library to add the given thread to the active set of threads and contending for the lock; and in response to determining that the given thread should not be placed in the active set, adding the given thread to a passive set of threads, wherein threads in the passive set are not able to contend for the lock.

7. The method of claim 1, wherein the multithreaded application comprises a plurality of threads including the thread and the other thread, wherein individual threads of the plurality of threads calling a lock function of the other library respectively join an active set of threads actively contending for the lock, and wherein at least a portion of the plurality of threads calling a lock function of the generic concurrency restriction library respectively join the passive set of threads not actively contending for the lock.

8. A system, comprising: a processor; and a memory, comprising program instructions that when executed by the processor cause the processor to implement a multithreaded application configured to: invoke, by a thread of the multithreaded application holding a lock, an Application Programming Interface (API) to release the lock; and perform, responsive to invoking the API, by a function of a generic concurrency restriction library complying with the API that wraps another library complying with the API: transition another thread passively waiting on the lock to actively contending for the lock, wherein to transition the other thread, the thread is configured to: remove the other thread from a passive set of threads; and cause execution, by the other thread, of a lock function of the other library to allocate the lock; and executing a release function of the other library to release the lock.

9. The system of claim 8, the multithreaded application further configured to: allocate the lock, by the thread prior to invoking the API to release the lock, comprising setting, within the function of the generic concurrency restriction library, a lock flag to indicate that the lock is held.

10. The system of claim 9, the multithreaded application further configured to: passively wait on the lock, by the other thread responsive to determining, according to the lock flag, that the lock is held and that a number of threads actively contending for the lock exceeds a threshold.

11. The system of claim 10, wherein to transition the other thread the multithreaded application is configured to: signal, by the thread, an indication that the other thread should be activated based at least in part on determining that the number of threads actively contending for the lock does not exceed the threshold; and join, by the other thread in response to the signal, an active set of threads contending for the lock, comprising atomically incrementing a counter representing the number of threads actively contending for the lock.

12. The system of claim 8, wherein to actively contend for the lock the other thread is configured to invoke a lock function of the other library.

13. The system of claim 8, wherein a given thread of the multithreaded application is configured to: execute the lock function of a generic concurrency restriction library to: determine whether the given thread should be placed in an active set of threads associated with the lock, wherein threads in the active set are able to contend for the lock; in response to determining that the given thread should be placed in the active set, execute the lock function of the other library to add the given thread to the active set of threads and contending for the lock; and in response to determining that the given thread should not be placed in the active set, add the given thread to a passive set of threads, wherein threads in the passive set are not able to contend for the lock.

14. The system of claim 8, wherein the multithreaded application comprises a plurality of threads including the thread and the other thread, wherein individual threads of the plurality of threads calling a lock function of the other library respectively join an active set of threads actively contending for the lock, and wherein at least a portion of the plurality of threads calling a lock function of the generic concurrency restriction library respectively join the passive set of threads not actively contending for the lock.

15. A non-transitory, computer-readable storage medium storing program instructions that when executed on one or more processors cause the one or more processors to implement a multithreaded application performing: invoking, by a thread of the multithreaded application holding a lock, an Application Programming Interface (API) to release the lock; and performing, responsive to invoking the API, by a function of a generic concurrency restriction library complying with the API that wraps another library complying with the API: transitioning another thread passively waiting on the lock to actively contending for the lock, comprising: removing the other thread from a passive set of threads; and causing execution, by the other thread, of a lock function of the other library to allocate the lock; and executing a release function of the other library to release the lock.

16. The non-transitory, computer-readable storage medium of claim 15, the multithreaded application further performing: allocating the lock, by the thread prior to invoking the API to release the lock, comprising setting, within the function of the generic concurrency restriction library, a lock flag to indicate that the lock is held.

17. The non-transitory, computer-readable storage medium of claim 16, the multithreaded application further performing: passively waiting on the lock, by the other thread responsive to determining, according to the lock flag, that the lock is held and that a number of threads actively contending for the lock exceeds a threshold.

18. The non-transitory, computer-readable storage medium of claim 17, wherein transitioning the other thread passively waiting on the lock to actively contending for the lock comprises: signaling, by the thread, an indication that the other thread should be activated based at least in part on determining that the number of threads actively contending for the lock does not exceed the threshold; and joining, by the other thread in response to the signal, an active set of threads contending for the lock, comprising atomically incrementing a counter representing the number of threads actively contending for the lock.

19. The non-transitory, computer-readable storage medium of claim 15, wherein actively contending for the lock comprises invoking a lock function of the other library.

20. The non-transitory, computer-readable storage medium of claim 15, the multithreaded application further performing: performing, by the lock function of a generic concurrency restriction library executed by a given thread: determining whether the given thread should be placed in an active set of threads associated with the lock, wherein threads in the active set are able to contend for the lock; in response to determining that the given thread should be placed in the active set, executing the lock function of the other library to add the given thread to the active set of threads and contending for the lock; and in response to determining that the given thread should not be placed in the active set, adding the given thread to a passive set of threads, wherein threads in the passive set are not able to contend for the lock.

* * * * *